United States Patent [19]

Tsunoda et al.

[11] 4,301,527

[45] Nov. 17, 1981

[54] OPTICAL HEAD FOR A VIDEODISC RECORDER/PLAYER

[75] Inventors: Yoshito Tsunoda, Mitaka; Toshimitsu Miyauchi, Hachioji; Kazuo Shigematsu, Kawasaka; Kimio Tatsuno, Kokubunji, all of Japan

[73] Assignee: Hitachi, Ltd., Tokyo, Japan

[21] Appl. No.: 47,078

[22] Filed: Jun. 11, 1979

[30] Foreign Application Priority Data

Jun. 9, 1978 [JP]  Japan .................................. 53/68792

[51] Int. Cl.³ .............................................. G11B 7/12
[52] U.S. Cl. ........................................ 369/45; 369/112; 369/122; 358/128.5
[58] Field of Search ........................... 358/128, 128.5; 179/100.1 G, 100.3 V, 2; 346/76 L; 350/229, 225; 250/553, 201

[56] References Cited

U.S. PATENT DOCUMENTS

| | | | |
|---|---|---|---|
| 3,866,238 | 2/1975 | Monroe | 365/127 |
| 3,952,148 | 4/1976 | Laub | 179/100.1 G |
| 3,969,575 | 7/1976 | Gerritsen | 358/127 |
| 4,027,330 | 5/1977 | Maslowski | 179/100.3 V |
| 4,051,528 | 9/1977 | Takeda | 358/128 |
| 4,074,314 | 2/1978 | Velzel | 179/100.1 G |
| 4,085,423 | 4/1978 | Tsunoda et al. | 179/100.1 G |
| 4,115,809 | 9/1978 | Ueno | 179/100.3 V |
| 4,179,708 | 12/1979 | Sheng | 179/100.1 G |

OTHER PUBLICATIONS

Sears et al., "University Physics", ©1955, Addison Wealey Publishing Co., Inc., pp. 767, 775.

Primary Examiner—Alan Faber
Attorney, Agent, or Firm—Craig and Antonelli

[57] ABSTRACT

An optical head comprising a lens disposed at a position for forming spot images of a semiconductor laser having a plurality of lasing points, in which beams from the semiconductor laser are focused on a disc on which predetermined information is recorded by light.

9 Claims, 3 Drawing Figures

OPTICAL HEAD FOR A VIDEODISC RECORDER/PLAYER

BACKGROUND OF THE INVENTION (1) Field of the Invention

The present invention relates to an optical head. More particularly, the invention relates to an optical head including as a light source a semiconductor laser having a plurality of lasing points.

(2) Description of the Prior Art

There has heretofore been adopted a method in which video or digital information is recorded and reproduced on a recording material (for example, a thin metal layer or thin calcogenite glass layer) formed on a disc or drum by using as a light source a laser beam from a smallsize compact semiconductor laser. In accordance with this method, it may be considered to use a semiconductor laser array having a plurality of lasing points as the semiconductor laser so that some of the lasing points are used as the light source for recording of information and the remaining lasing points are used for reproduction of information, for focusing error signal detection and for tracking error signal detection.

However, in such conventional semiconductor laser arrays, the respective lasing points are formed at intervals of about 100 to about 200 μm, and therefore, laser beams from the lasing points 1a and 1b on the semiconductor laser array 1 are changed to laser beams 3a and 3b after passage through a coupling lens 2, as shown in FIG. 1. It can be seen that, as the distance from the coupling lens is increased, the beams 3a and 3b are separated from each other remarkably. As a result, the majority of the laser beams pass beyond the lens aperture of the laser beam focusing lens 4. For example, let it be assumed that the distance between the lasing points 1a and 1b is 200 μm, the magnification of the coupling lens 2 is 20, the distance from the lens 2 to the imaging point is $l_1$, the magnification of the focusing lens 4 is 20 and the distance from the lens 4 to the imaging point is $l_2$ (which is equal to $l_1$), the distance between the beams 3a and 3b on the imaging plane P is 4 mm (equal to 200 μm×20) and this distance on the focusing lens is 8 mm. Further, assuming that the aperture diameter of the focusing lens is 6 mm, the beams 3a and 3b are hardly introduced at all into the aperture of the focusing lens. Accordingly, this problem cannot be solved without approximating the points 1a and 1b to each other very closely. However, from the viewpoint of the thermal and electronic interferences of two lasing points, the distance between the points 1a and 1b should be at least about 100 μm. Even in the case, the distance between the beams 3a and 3b on the focusing lens 4 is 4 mm and therefore, the truncation of the beams becomes very large. When there are three or more lasing points, beams are not substantially introduced into the focusing lens.

SUMMARY OF THE INVENTION

It is a primary object of the present invention to provide an optical head for processing of information, in which the foregoing problem is effectively solved and a plurality of laser beams from a semiconductor laser array can be focused at high efficiency on a disc or drum without truncation on a focusing lens.

In accordance with the present invention, this object can be attained by an optical head characterized in that a lens is disposed at a point where lasing spots of a semiconductor laser array are formed.

DETAILED DESCRIPTION OF THE PREFERRED EMBODIMENTS

Figure 1:
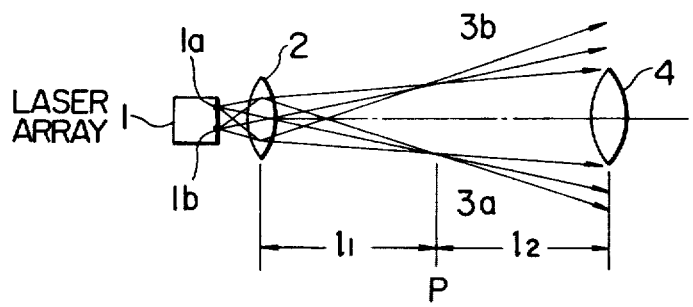
FIG. 1 is a diagram illustrating the conventional technique.
Figure 2:
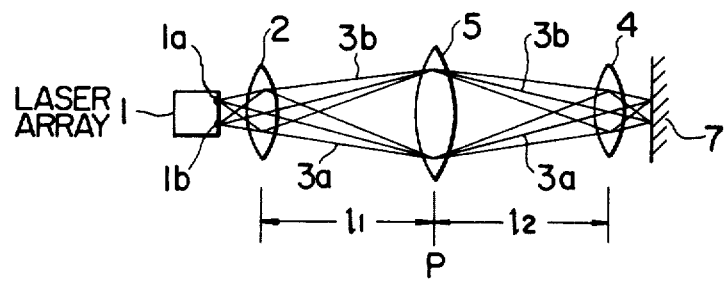
FIG. 2 is a diagram illustrating the structure of one embodiment of the present invention.

Referring to FIG. 2 illustrating the structure of one embodiment of the present invention, laser beams from lasing points 1a and 1b on a semiconductor laser array 1 pass through a coupling lens 2 having a magnification of, for example, 20 and are then separated into two laser beams 3a and 3b and imaged with enlargement on an imaging plane P. A convex lens 5 is placed on the imaging plane P and the focal distance is selected so that an image on the coupling lens 2 is focused onto a focusing lens 4. Namely, the focal distance f of the lens 5 is selected so that the relation of $1/f = 1/l_1 + 1/l_2$ is established. By this arrangement, the beams 3a and 3b are superimposed to each other just on the focusing lens 4 and truncation by the lens 4 cannot be caused at all. Furthermore, since the lens 5 is disposed on the imaging plane, minute spots can be formed on a final imaging plane 7 (i.e. on the disc surface) without imposing any influence on the inherent focusing relation between the lenses 2 and 4 on the lasing points.

Similar effects can be attained when a cylindrical lens or prism is disposed on the plane P instead of the lens 5 to achieve the same focusing of the beams onto the focusing lens 4 as done by the convex lens 5. In the drawing, an embodiment where two lasing points are formed is illustrated, and the above effects are similarly attained when three or more lasing points are formed.

Figure 3:
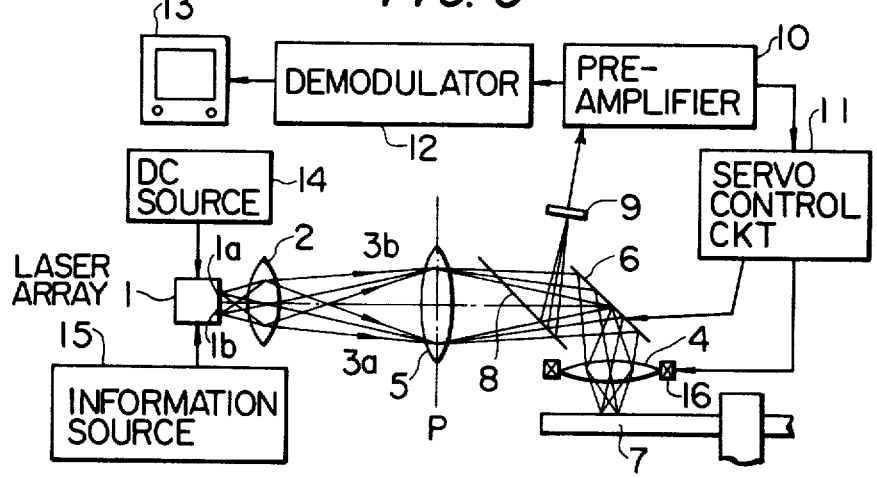
FIG. 3 is a view showing diagrammatically an information processing device including an optical head of the embodiment shown in FIG. 2.

Referring to FIG. 3 illustrating an instance of an information processing device including the optical head of the present invention, a lasing point 1a for reproduction of information and spot control, which makes continuous operation at an output of about 1 to about 5 mW by a direct current source 14, and a lasing point 1b for recording of information, which makes pulse oscillation at an output peak of 10 to 20 mW by an information source 15, are formed on a semiconductor laser array 1. Two laser beams 3a and 3b pass through a coupling lens 2 and a convex lens 5 disposed on an imaging plane P and are then reflected by a galvano mirror 6 and focused into a recording material (metal thin layer or calgonite glass thin layer) on a disc (or drum) 7 by a focusing lens 4 set in a moving coil 16. Among beams reflected from the disc, one corresponding to the lasing point 1a for reproduction is guided to a light detector 9 by a beam splitter 8. A signal detected by the detector 9 is amplified by a preamplifier 10 and guided to a servo control circuit 11. The output of this signal is guided to the moving coil 16 for controlling the position of the lens 4 and galvano mirror 6, so that the laser beam is controlled so that it is always focused correctly on the disc 7. The spot from the lasing point 1b is controlled on the disc simultaneously with the spot from the lasing point 1a. Just after information is thus recorded, an information track is followed by the spot from the lasing point 1a according to the abovementioned spot control to effect reproduction of the information. The reproduced informations are detected by the light detector 9, passed through the preamplifier 10, demodulated by a demodulator 12 (ordinarily, signals are recorded after FM modulation) and guided to and displayed and on a television monitor 13.

Also in this embodiment, by provision of the convex lens 5, truncation of two beams on the focusing lens 4 can be completely prevented and laser beams from lasing points on the semiconductor laser array can be focused in minute spots at high efficiency with high precision.

As will be apparent from the foregoing illustration, by using the optical head for processing of informations according to the present invention, laser beams can be focused in very minute spots very simply at a high beam utilization ratio. Therefore, a reproduction signal having a high signal-to-noise ratio can be obtained.

What is claimed is:

1. An information processing optical head comprising a semiconductor laser light source and an optical system for focusing beams from said light source on a recording medium on which predetermined information is recorded using the light from the semiconductor laser light source, wherein said semiconductor laser light source has a plurality of lasing points and said optical system includes a first lens for forming spot images of the lasing points of the semiconductor laser, a second lens disposed on a plane where said spot images of the lasing points are formed, and a third lens for focusing the beams passing through the second lens on said recording medium, wherein the focal distance of the second lens is set by the relation:

$$1/f = 1/l_1 + 1/l_2$$

where $l_1$ is the distance between the first and second lens, and $l_2$ is the distance between the second and third lens, so that said second lens prevents truncation by the third lens of the beams from the plurality of lasing points.

2. An information processing optical head according to claim 1, wherein the second lens is convex.

3. An information processing optical head according to claim 1, wherein the second lens is cylindrical.

4. An information processing optical head according to claim 1, wherein the second lens is a prism.

5. An information processing device comprising:
a semiconductor light source having a plurality of lasing points for producing a plurality of light beams;
an information source coupled to said semiconductor light source; and
an optical system for focusing beams from said plurality of lasing points on a recording medium on which information from said information source is recorded using the light from the semiconductor laser light source, wherein said optical system includes a first lens for forming spot images of the lasing points of the semiconductor laser, a second lens disposed on a plane where said spot images of the lasing points are formed, and a third lens for focusing the beams passing through the second lens on said recording medium, wherein the focal distance of the second lens is set by the relation:

$$1/f = 1/l_1 + 1/l_2$$

where $l_1$ is the distance between the first and second lens, and $l_2$ is the distance between the second and third lens, so that said second lens prevents truncation by the third lens of the beams from the plurality of lasing points.

6. An information processing device according to claim 5, further comprising a light detector for detecting light from at least one light beam corresponding to one of said plurality of lasing points.

7. An information processing device according to claim 6, further comprising a beam splitter located between said second and third lens for coupling said at least one light beam to said light detector.

8. An information processing device according to claim 7, further comprising a servo control means coupled between the light detector and the third lens for controlling the position of the third lens in accordance with the light sensed by said light detector to thereby control the focus of light onto the recording medium.

9. An information processing device according to claim 1 or 5, wherein the second lens has a focal distance which focuses an image formed on the first lens by the light source onto the third lens.

* * * * *